(12) United States Patent
Kranjac

(10) Patent No.: US 6,230,595 B1
(45) Date of Patent: May 15, 2001

(54) TOOL POST

(75) Inventor: Romano Kranjac, Clifton, NJ (US)

(73) Assignee: Aloris Tool Technology Co., Inc., Clifton, NJ (US)

( * ) Notice: Subject to any disclaimer, the term of this patent is extended or adjusted under 35 U.S.C. 154(b) by 0 days.

(21) Appl. No.: 09/045,674

(22) Filed: Mar. 20, 1998

(51) Int. Cl.[7] .................................................. B23B 29/24
(52) U.S. Cl. ............................. 82/159; 82/158; 82/161
(58) Field of Search .............................. 82/159, 158, 157, 82/156, 153, 152, 121, 120, 100, 161

(56) References Cited

U.S. PATENT DOCUMENTS

| | | | | |
|---|---|---|---|---|
| 939,976 | * | 11/1909 | Carr | 82/161 |
| 2,335,712 | * | 11/1943 | Vitale | 82/159 X |
| 2,403,405 | * | 7/1946 | Sirola | 29/35.5 |
| 2,972,272 | * | 2/1961 | Sirola | 82/159 |
| 4,126,067 | * | 11/1978 | Giannetti | 82/159 |
| 4,286,485 | * | 9/1981 | Dezvane et al. | 82/158 |
| 5,214,989 | * | 6/1993 | Giannetti | 82/159 |
| 5,560,272 | * | 10/1996 | Bolger | 82/160 |

* cited by examiner

*Primary Examiner*—Henry Tsai
(74) *Attorney, Agent, or Firm*—Duane Morris & Heckscher LLP

(57) ABSTRACT

A tool post has gibs for locking tool holders onto dovetail tool mounts, the gibs having an extended range of movement vertically on the tool post to permit mounting of tool holders in a range of vertical positions on the tool mounts. The tool post has mounts for several tool holders, which may be independently locked on the mounts and unlocked from the mounts by adjustment of independently movable gibs. The tool post has a handle with a movable adjustable pawl, and upwardly-projecting screw heads projecting from the top of the tool post. The pawl is movable so that the handle can selectively be rotated between screw heads. The screw heads drive screws which move gibs for locking and unlocking tool holders on the tool mounts. The tool post has a base plate with a non-circular element rigidly attached thereto. The element may be fixed on a lathe to prevent rotation of the body of the tool post.

8 Claims, 7 Drawing Sheets

TOOL POST

BACKGROUND AND FIELD OF THE INVENTION

This invention relates to supports for tooling for use with lathes, and more particularly to tool posts.

Tool posts are devices that are adapted to be mounted on machine tool beds or compounds of lathes or other machine tools to support tool holders. The tool holders in turn hold the tools which actually work on the workpiece. Tool posts have been provided with a main body having on two sides horizontally-projecting tongues or mounts in a dovetail configuration. Tool holders are provided with a mating slot so as to permit the tool holders to be mounted on the dovetail mounts. A tool post and tool holder with this type of configuration is shown for example, in U.S. Pat. No. 2,972,272 of Sirola.

Tool holders are engaged on the sides of the tool posts by wedge-shaped gibs that form one surface of the dovetail-shaped tongue. The wedge-shaped gibs are integrated with a cam follower surface that is adapted to be engaged by a helical cam surface on a vertical screw in the center of the tool post body block. By turning a handle mounted on the screw, the gibs are moved vertically to lock and unlock the tool holders from the dovetail mounts.

The inventor has noted a variety of disadvantages associated with prior art designs of tool posts with dovetail mounts. The tool posts are prone to rotation with respect to the compound on the lathe, as only friction between the bottom surface of the body block and the top surface of the compound of the lathe holds the body block in place. The tool holders cannot be indexed and cannot be selectively removed and added. This results in periods of time when the tool post, and as a result the lathe on which it is mounted, is out of service while tool holders are changed. Accurate indexing and rotation of the tool post requires moving of the body block relative to an index plate. Tool posts of the prior art have very limited options as to the height of the tool holders on the tool posts.

OBJECTS AND ADVANTAGES OF THE INVENTION

It is an object of the invention to provide a tool post that permits selective disengaging of tool holders.

It is a further object of the invention to provide a tool post that resists rotation relative to the surface on which it is mounted.

It is a further object of the invention to provide a tool post that is readily indexable.

It is an advantage of the invention that it provides a tool post that permits selective disengaging of tool holders.

It is a further advantage of the invention that it provides a tool post that resists rotation relative to the surface on which it is mounted.

It is a further advantage of the invention that it provides a tool post that is readily indexable.

Further objects and advantages of the invention will become evident from perusal of the detailed description of a preferred embodiment which follows.

SUMMARY OF THE INVENTION

According to an aspect of the invention, a tool post has a body block with tool mounts on an outer side surface thereof. Each mount has a substantially vertical planar side wall and vertically undercut grooves. In each of the grooves, there is mounted a tapered gib having a wedge shape which moves vertically the groove. The vertical range of movement of the gib is at least about one-quarter inch. The gib and the mount are adapted to lock a tool holder of suitable size to the mount in a range of vertical positions of more than about one-quarter inch.

In another aspect of the invention, a tool post has a body block having a generally vertical outer surface and tool holder mounts on the outer surface. A gib is associated with each of the mounts. Each gib is movable with respect to the corresponding mount so that movement of said gib effectively alters a dimension of said mount. Each gib has attached thereto a helically scribed curving surface. Helically threaded screws are rotatably mounted in the body block, and each screw is threaded and mounted to engage with the curving surface of one of the gibs. As a result, rotation of one of said screws moves one and only one of said gibs. Rotation of the gibs permits locking and unlocking of tool holders mounted on each of the mounts on the tool post independently of tool holders on any other mounts.

According to another aspect of the invention, a tool post includes a body block which has a central vertical axis, a top surface, a bottom surface, and tool holder mounts on an outer side surface thereof. A selected angular distance about the axis separates adjacent pairs of mounts. A central vertical bore is defined in the body block. An indexing plate is positioned below the body block, and is selectively engageable with the bottom surface of, and coaxial with, the body block. A vertical cylindrical sleeve is attached at its lower end to the indexing plate, is located in the bore and extends above the top surface of the body block. A handle is rotatably mounted on the sleeve. The handle has, rotatably mounted thereon and depending downward therefrom a pawl, which is rotatable between first and second positions. Rods project upward from the top surface. The pawl and the rods are so mounted and dimensioned that the pawl engages the rods in its first position and does not engage said rods in its second position. The angular separation between the rods corresponds to the positions of tool holder mounts on each side of the tool post. The pawl permits rough adjustment of the tool post when it is desired to cease using a tool held by a tool holder mounted on one side of the tool post and commence using a tool held by a tool holder mounted on a different side of the tool post.

In another aspect of the invention, A tool post has a body block having a mounts for tool holders, an indexing plate located below the body block, and a non-circular element rigidly attached to and depending downward from the indexing plate.

DETAILED DESCRIPTION OF A PREFERRED EMBODIMENT

Figure 1:
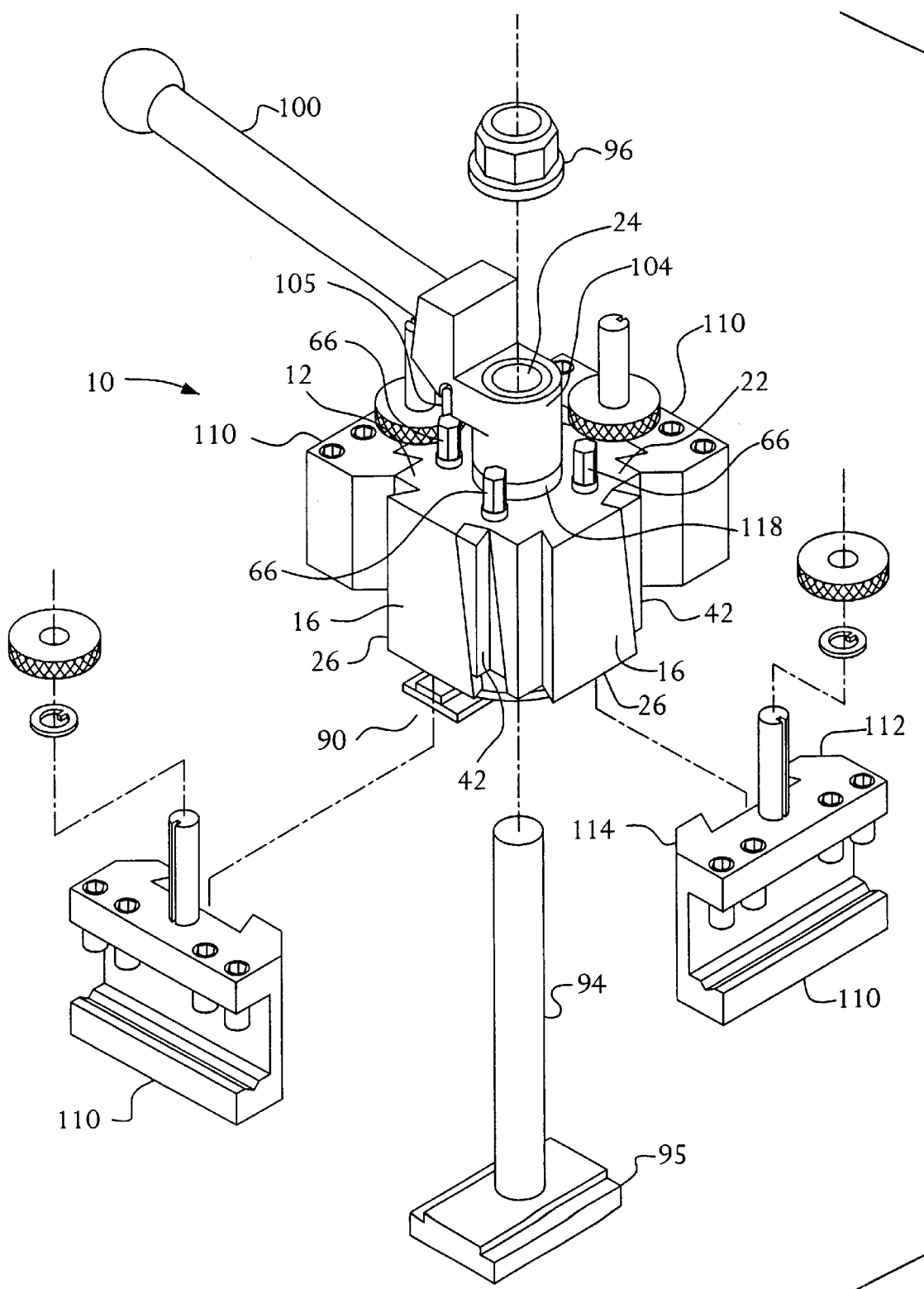
FIG. 1 is an exploded isometric view of a tool post according to the invention showing the positioning of tool holders.
Figure 2:
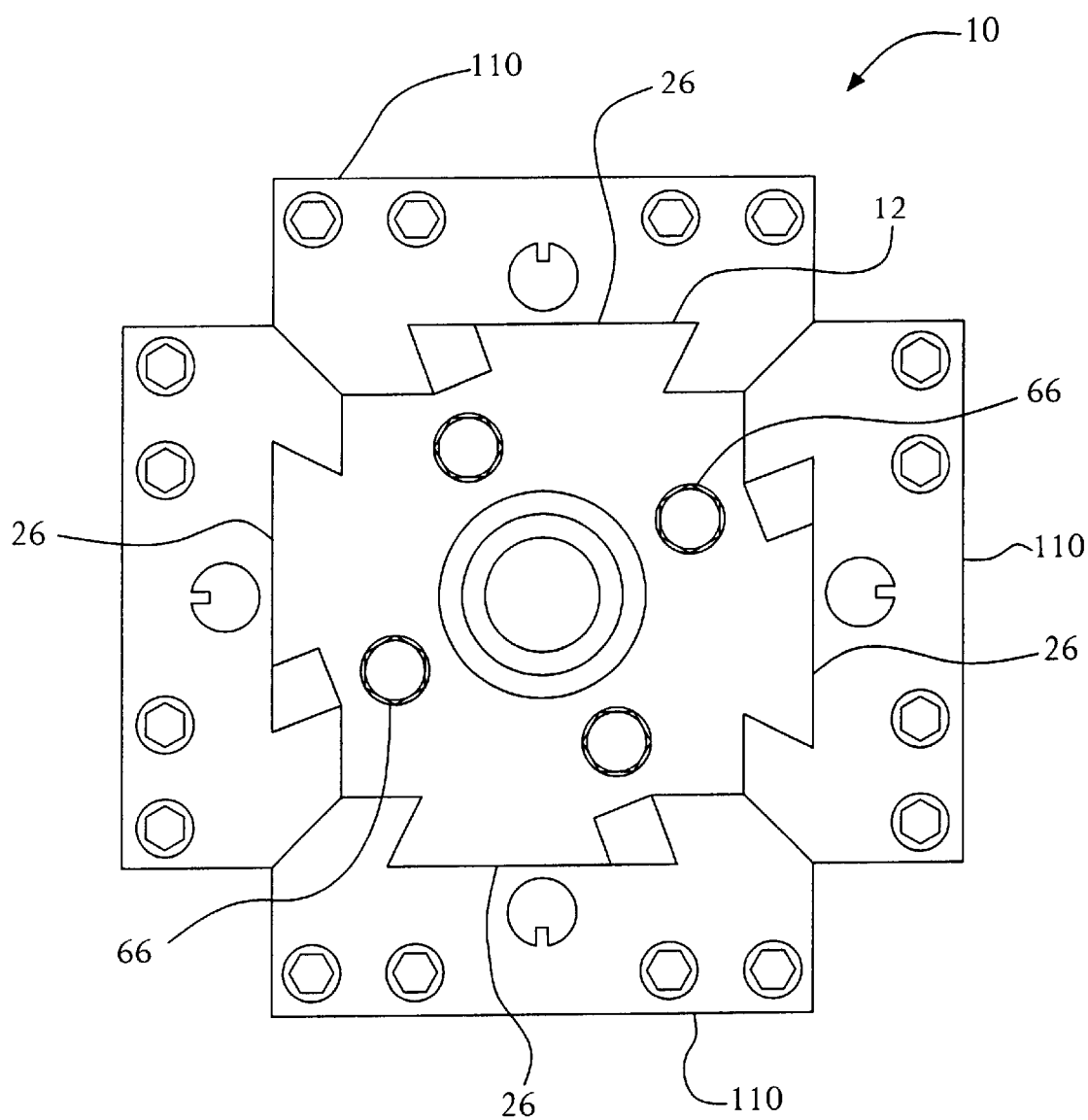
FIG. 2 is a top view of a tool post according to the invention showing the positioning of tool holders.

Referring to the Figures, there is shown a tool post 10 having body block 12 generally in the form of a rectangular prism having a generally planar horizontal bottom surface, four generally vertical sides 16, a generally planar top surface 22, and a central vertical axial bore 24. On each of the four sides 16 there is provided a radially-outwardly projecting mount or tongue 26. Mounts 26 have a dovetail configuration, having a vertical planar outer wall and undercut grooves on the sides of the outer wall to define a dovetail form, as may best be seen in FIG. 2. The four mounts 26 are all of identical dimensions. The dimensions of the mounts are selected to permit substantial movement of a conventional tool holder in a vertical direction on the mount. By substantial movement, the inventor means more than about one-eighth of an inch. Preferably, the range of movement is at least about one inch. The dimensions vary depending on the size of tool post and tool holder selected.

Figure 3:
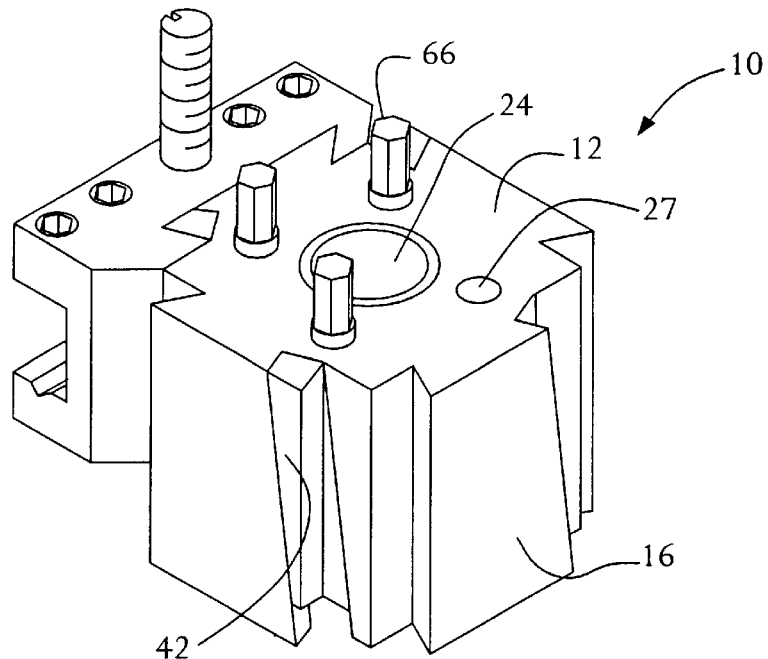
FIG. 3 is an isometric view of a partially-disassembled exemplary tool post according to the invention.
Figure 4:
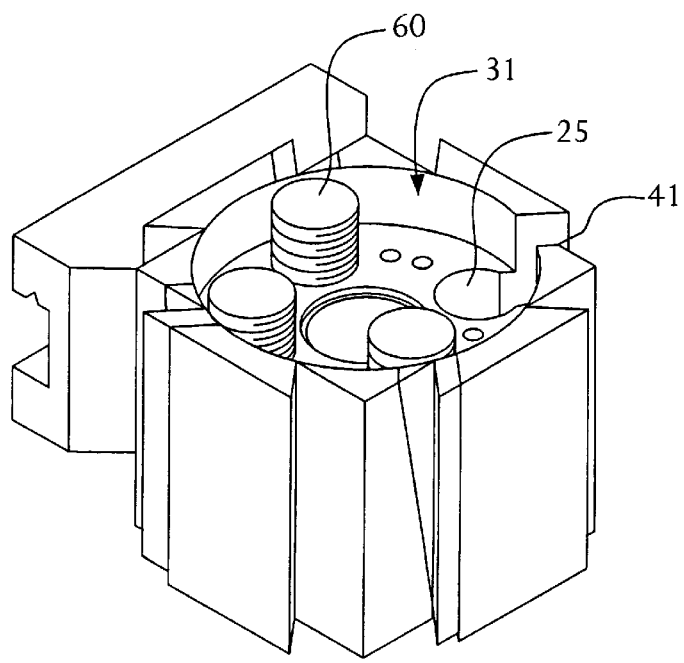
FIG. 4 is an isometric view showing the bottom of a partially-disassembled exemplary tool post of the invention.
Figures 6, 6A, 7:
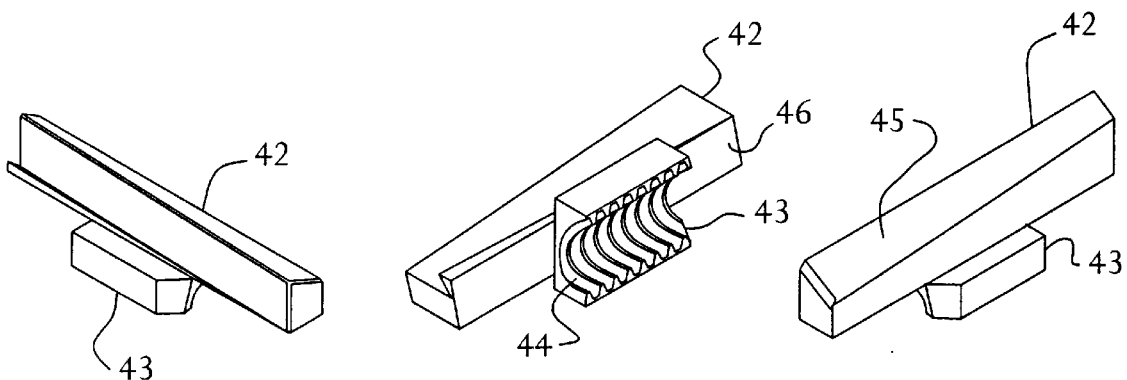
FIGS. 6, 6A and 7 are isometric views of an exemplary wedge for use in the tool post of FIG. 3.

Four vertical slots 41, which may be seen in FIGS. 3 and 4, are provided in body 12, and specifically in the undercut portions of each mount 26. Wedge-shaped gibs 42 are mounted in each of the slots. Referring to FIGS. 6 and 7, gib 42 has four substantially vertical sides. A planar outer side 45 aligns with the outer side of mount 26, and an opposite inner side 46 has rigidly attached thereto a metal piece 43 formed to a cylindrical section, defining a curving surface 44 threaded to mate with the corresponding screw. A first planar side surface of gib 42 intermediate the inner and outer sides is designed to abut against an inner surface of mount 26. An opposite planar side surface is adapted to abut against the inner surface of the receiving slot on the tool holder. Each gib 42 is mounted with the thicker portion at the top. Each gib 42 is the same length as the height of mount 26 to permit mounting of tool holder 110 at a full range of vertical positions.

Figure 5:
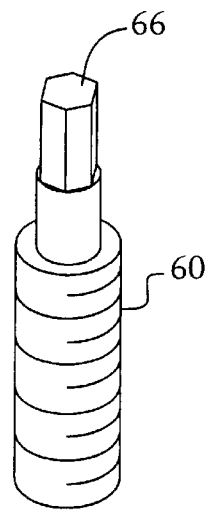
FIG. 5 is an isometric view of an exemplary screw for use in the tool post of FIG. 3.
Figure 13:
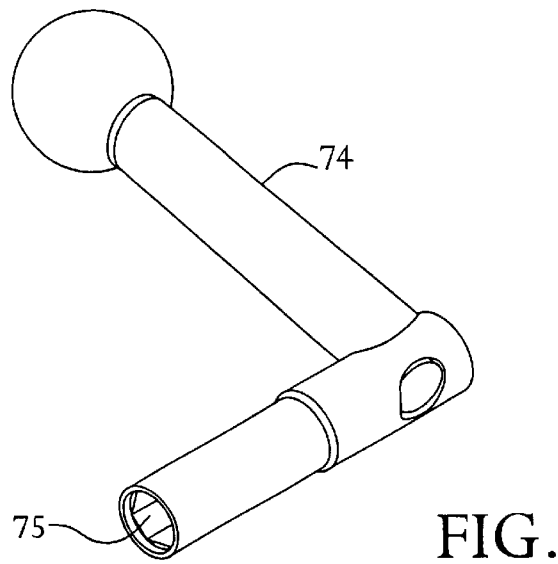
FIG. 13 is an isometric view of an exemplary handle for turning the screw heads on the tool post of FIG. 3.
Figure 14:
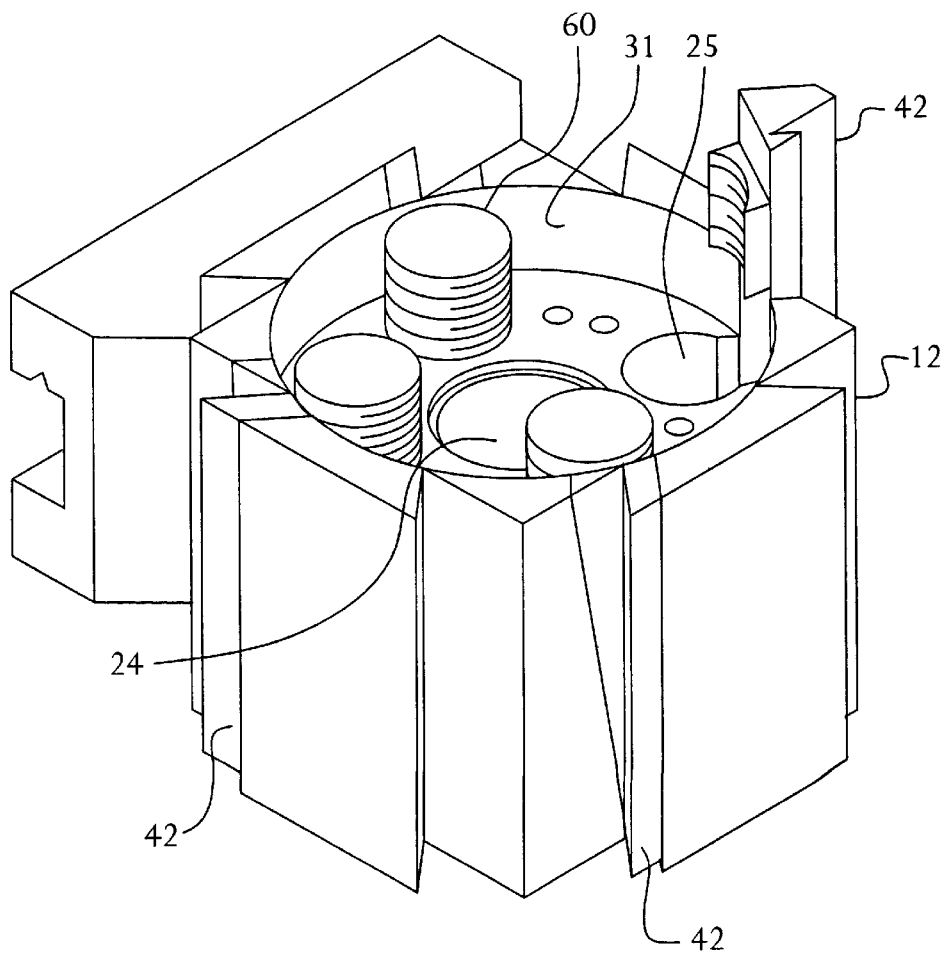
FIG. 14 is an isometric view showing the bottom of the body of the tool post of FIG. 3.

Radially inward of and communicating with each of vertical slots 41 and radially outward of central bore 24, and not in communication with central bore 24, there are provided cylindrical vertical screw bores. A screw bore 25 may best be seen in FIG. 4. Each screw bore 25 extends through the bottom of body 12 with the full diameter of the screw bore. In each screw bore 25 there is vertically mounted a screw 60. A exemplary screw 60 is shown in FIG. 5. Screws 60 are threaded so as to engage with curving surface 44, which is a cam follower surface, on each gib 42. Screws 60 may have a double lead thread to permit relatively rapid movement of the gib 42 with a relatively small rotation of the screw or of a handle actuating the screw. As may be seen in FIG. 3, extensions 27 of screw bores 25, which extensions 27 are more narrow in diameter than screw bores 25, project through the upper surface of body 12. Screws 60 have screw heads 66 which project through the upper surface of body 12. Screw heads 66 are adapted to be engaged with a suitable tool. In the illustrated embodiment, screw heads 66 are hexagonal and adapted to engage with a hexagonal bore 75 in handle 74 shown in FIG. 13.

By rotation of handle 74 a short angular distance, such as about 90 degrees, tool holders 110 may be locked and unlocked. By rotation of handle 74 a more significant distance, gibs 42 are moved vertically a significant distance, permitting the vertical position on the tool post at which a tool holder may be fixed to be substantially adjusted. As four separate screws are provided, four tool holders may be engaged and disengaged entirely independently of one another.

Figure 8:
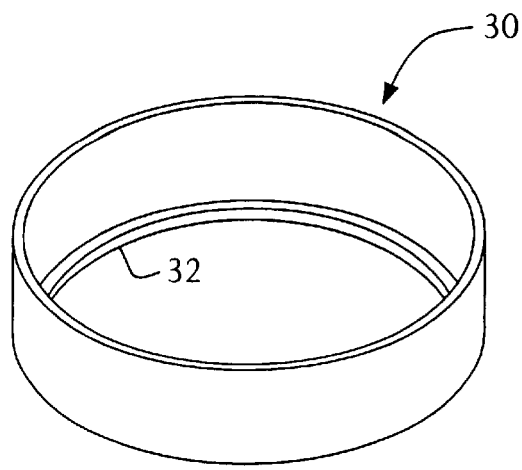
FIG. 8 is an isometric view of an exemplary sleeve in the lower enlargement of the central vertical bore of the tool post of FIG. 3.
Figure 9:
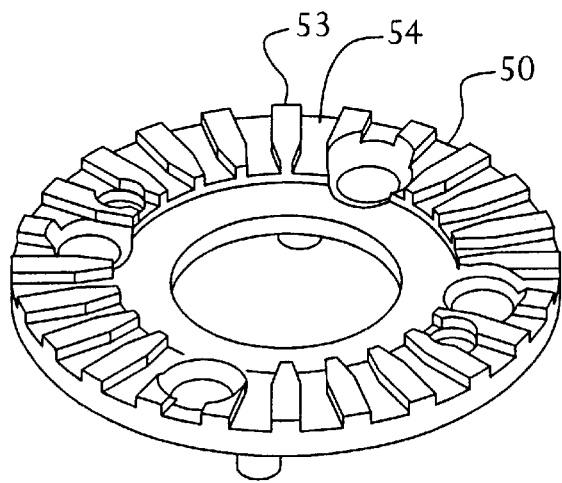
FIG. 9 is an isometric view of the bottom surface of an exemplary index plate of the tool post of FIG. 3.
Figure 10:
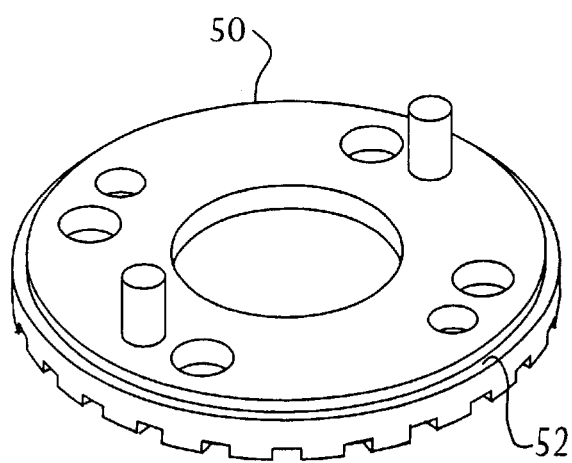
FIG. 10 is an isometric view of the top surface of the index plate of FIG. 9.
Figure 11:
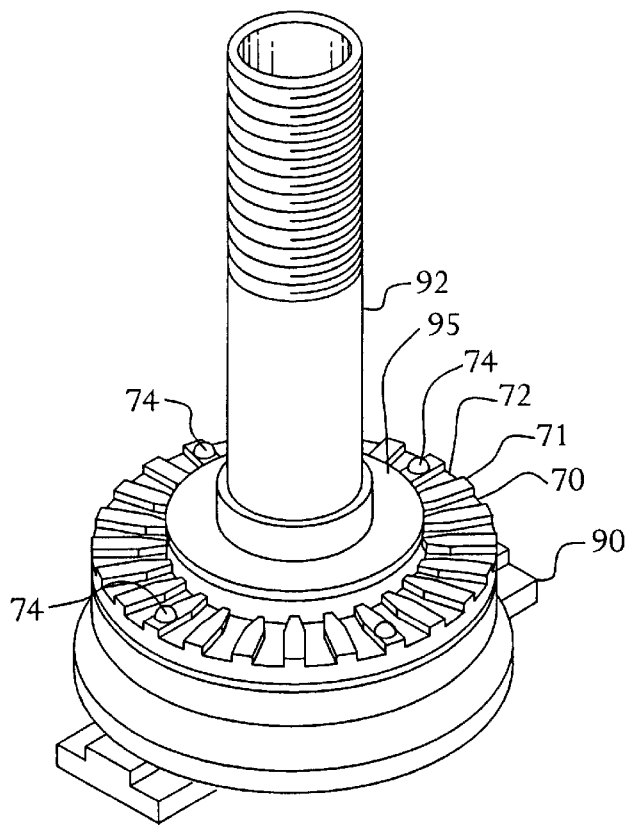
FIG. 11 is an isometric view of the index plate and sleeve for the tool post of FIG. 3.
Figure 12:
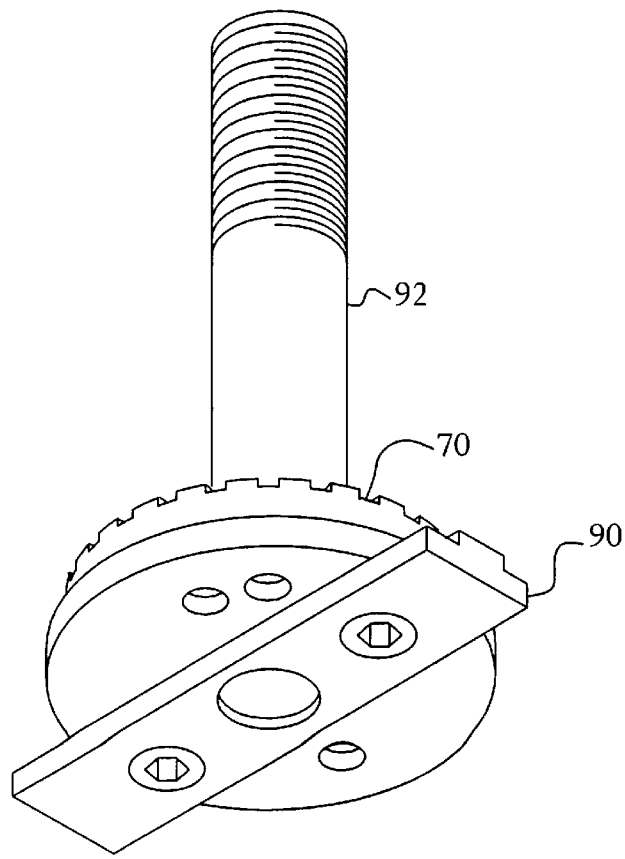
FIG. 12 is an isometric view of the bottom of the index plate of FIG. 11.

Central bore 24 is enlarged at the bottom of body 12, as may be seen in FIG. 4. The enlarged bottom portion of central bore 24 is referred to as portion 31. Sleeve 30, referring to FIG. 8, is fitted within enlarged portion 31. Sleeve 30 has lip 32 projecting radially inward at the top thereof Cylindrical index plate 50, shown in FIGS. 9 and 10, having a cylindrical bore in the center thereof, is positioned in sleeve 30. A circumferential notch 52 around the upper edge of index plate 50 mates with lip 32 of sleeve 30. The bottom surface of index plate 50 has a plurality, such as 28, of alternating radial ribs 53 and grooves 54. Cylindrical base plate 70, shown in FIGS. 11 and 12, having a central bore, has mating ribs 71 and grooves 72. The body 12 may be rotated relative to the base plate and positioned precisely at a selected angular position relative to the lathe on which it is working as a result of the ribs and grooves.

Base plate 70 has rigidly mounted on its lower side anti-rotational device 90. Anti-rotational device 90 is implemented by a rectangular plate rigidly mounted on the lower surface of base plate 70. Anti-rotational device 90 may be securely mounted on the compound of a lathe to prevent rotation of the base plate relative to the compound. As a result, the base plate cannot rotate with respect to the compound on the lathe, and when the index plate and the base plate are locked together by the ribs and grooves, even under extreme cutting conditions, tool post 10 will not rotate with respect to the compound on the lathe.

Base plate 70 is mounted on a vertical cylindrical sleeve 92 in the center thereof. The sleeve is positioned within the central cylindrical bore 24 of body 12. Interior to sleeve 92 is a solid cylindrical post 94. The lower end of cylindrical post 94 terminates in a generally rectangular slide block 95 which is rigidly secured on the compound of a lathe. The upper end of post 94 is threaded to accommodate nut 96. The upper end of sleeve 92 is threaded to accommodate handle 100, which is mounted on sleeve 104 having an interior cylindrical vertical bore with a mating thread.

There is provided on the base plate 70 and around sleeve 92 spring device 95. Spring device 95 may be made up of wave washers. Spring device 95 serves to render the body spring-loaded relative to the base plate. When handle 100 is loosened sufficiently, spring device 95 will urge body upward sufficiently that the rib and groove assemblies of index plate 50 and base plate 70 are disengaged from one another. Base plate 70 has on the top thereof spring-loaded ball bearings 74 that project above the top of ribs 71. Ball bearings 74 make index plate 50 ride more easily over base plate 70 when body 12 is being rotated relative to base plate 70. In addition, the user can feel the increments and therefore the approximate positions of the ribs and grooves.

Depending downward from the base of handle 100 is a rotatably mounted pawl 105. Pawl 105 is selected to be of a size and to be mounted so as to impact screw heads 66 when in a lowered position. As handle 100 is rotated further, the body of the post will be rotated. This permits rough estimating of a turn of 90 degrees when changing positions; in other words, this is a rough indexing feature. Fine indexing is provided by the index plate and base plate. Pawl 105 can be rotated to a raised position to clear heads 66.

A wear disc 118 is provided about sleeve 92 immediately below the base 104 of handle 100. The height of the wear disc 118 may be selected depending on the position of the handle. Wear disc 118 also serves to reduce wear on the base of the handle and on the top surface of body 12.

Tool holders 110 are substantially conventional tool holders, except that they are beveled at a 45 degree angle at 112 and 114 to permit four tool holders to fit on a single tool post.

The invention has been explained with respect to a preferred embodiment, but it will be understood by those of skill in the art that numerous alterations and variations in the illustrated apparatus may be made without departing from the scope of the invention.

What is claimed is:

1. A tool post, comprising:
   a. a body block having a generally vertical outer surface and a plurality of mounts on said outer surface, a plurality of openings being defined in said outer surface;
   b. a plurality of gibs, each of said gibs being mounted through one of said openings and associated with and movable with respect to one of said mounts each of said gibs having attached thereto, and mounted interior to said outer surface, a helically scribed curving surface;
   c. a plurality of helically threaded screws rotatably mounted in said body block, each of said screws being threaded and mounted to engage with said curving surface of one of said gibs, whereby rotation of one of said screws moves one and only one of said gibs.

2. The tool post of claim 1, wherein each of said screws is mounted in a substantially vertical bore in said body block, said bores having a first portion of a first diameter, and a second portion of a second diameter smaller than said first diameter, said second portion extending through a top surface of said body block, and wherein each of said screws has a projecting head received in said second portion and extending above said top surface of said body block.

3. The tool post of claim 2, wherein said projecting heads are hexagonal.

4. The tool post of claim 1, wherein said openings are in the form of vertical slots, each of said gibs being mounted in one of said slots to move vertically.

5. A tool post, comprising:
   a. a body block having a central vertical axis, a top surface, a bottom surface, and having a plurality of tool holder mounts on an outer side surface thereof, a selected angular distance about said axis separating adjacent pairs of said mounts;
   b. a central vertical bore being defined in said body block;
   c. a base plate below, selectively engageable with the bottom surface of, and coaxial with, said body block;
   d. a vertical cylindrical sleeve attached at a lower end thereof to said base plate, located in and extending beyond said top surface;
   e. a handle rotatably mounted on said sleeve, said handle having rotatably mounted on and depending downward therefrom a pawl, said pawl being rotatable between first and second positions;
   f. a plurality of rods projecting upward from said top surface, said pawl and said rods being so mounted and dimensioned that said pawl engages said rods in said first position and does not engage said rods in said second position.

6. The tool post of claim 5, wherein said rods are heads of screws rotatable to lock and unlock tool holders on said tool mounts.

7. The tool post of claim 6, wherein there is provided one of said screw heads corresponding to each of said tool mounts.

8. The tool post of claim 5, further comprising
   g. a plurality of gibs, each of said gibs being associated with and movable with respect to one of said mounts each of said gibs having attached thereto a helically scribed curving surface;
   h. a plurality of helically threaded screws rotatably mounted in said body block, each of said screws being threaded and mounted to engage with said curving surface of one of said gibs, whereby rotation of one of said screws moves one and only one of said gibs, said rods being heads of said screws.

* * * * *